United States Patent Office 2,773,774
Patented Dec. 11, 1956

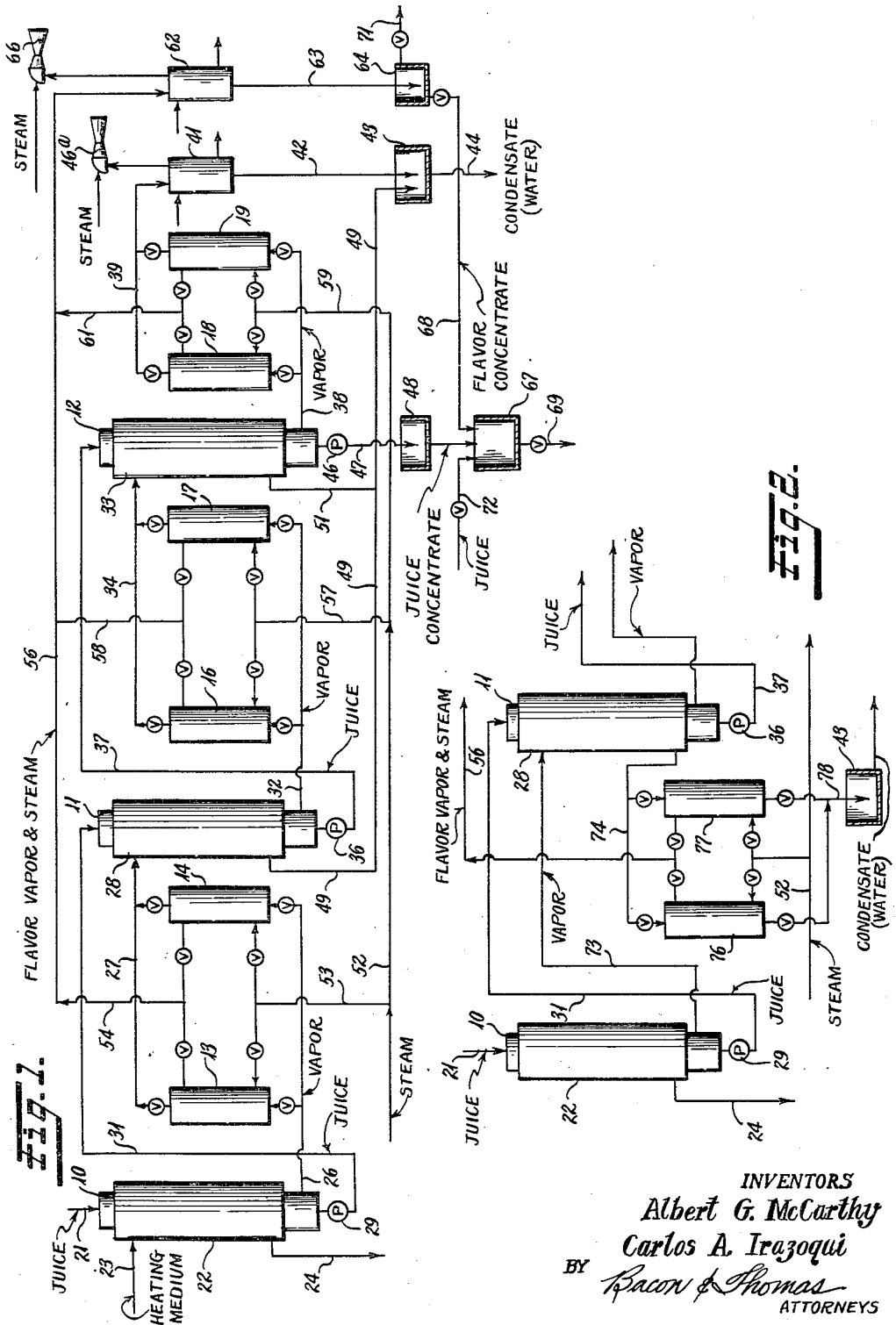

2,773,774

CONCENTRATION OF FRUIT JUICES

Albert G. McCarthy, Tampa, Fla., and Carlos A. Irazoqui, New York, N. Y., assignors to National Engineering & Development Corporation, New York, N. Y.

Application September 22, 1953, Serial No. 381,628

12 Claims. (Cl. 99—205)

The invention relates to concentration of fruit juices, and more particularly, to a process in which fruit juice is concentrated by evaporation of water therefrom at low temperatures and under vacuum conditions and volatile flavoring materials are recovered from the vaporized water and returned in undamaged form to the concentrated juice so that the concentrated juice has substantially its original flavor when diluted with water.

The flavoring materials in fruit juices and particularly those in citrus fruit juices such as orange juice are heat sensitive and degenerate into substances which have a bitter taste if subjected to elevated temperatures for appreciable periods of time. That is to say they are quite stable at usual ambient temperatures but their degeneration increases rapidly with both increased temperature and time of treatment at such increased temperature and substantial amounts of any bitter substances produced remain in the juice even though water is evaporated from the juice under vacuum conditions. At the present time large quantities of such juices are concentrated by evaporation of water therefrom at the lowest practical temperature, usually in multiple effect evaporators and preferably a temperature below 100° F. and under absolute pressures of less than 1 inch of mercury. Under these conditions substantially no deterioration of the flavoring materials takes place. However, most of the flavoring materials are vaporized and removed with the water vapors so that the concentrated juice has a "flat" taste when again diluted with water. Attempts have been made to recover at least a portion of the flavoring materials from the water vapor by fractional condensation or by fractional distillation of the condensed water vapor. These procedures have not resulted in sufficient recovery of flavoring materials to render the procedures commercially successful.

The most successful commercial process at the present time involves the addition of a portion of unconcentrated fresh juice to the concentrate so as to add some of the original flavoring materials. The amount of flavoring materials which can thus be added is, however, limited and the full flavor of the fresh juice cannot be obtained in the reconstituted juice, i. e., in the diluted concentrate. Nevertheless, very large amounts of such concentrate to which fresh unconcentrated juice has been added is sold in frozen form and such frozen, partly concentrated juice when thawed and diluted with water is the nearest approach to fresh juice of any of the commercial fruit juice concentrates.

In accordance with the present invention, it has been discovered that the flavoring materials vaporized with water in a concentration process can be substantially all separated from such water by adsorption on a solid adsorbent such as activated carbon. The desirable flavoring materials are water soluble and are to be distinguished from water insoluble essential oils which occur in the skin of citrus fruit and are present in only very small amounts in suspension in most fresh citrus fruit juice produced by present day juice extraction equipment. Such essential oils add a bitter taste to citrus fruit juice but are also largely vaporized in the concentration process. In the process of the present invention these essential oils are also adsorbed on the solid adsorbent. They can, however, be largely separated in the present process from the desired flavoring materials to leave a flavor concentrate which, when added to the juice concentrate, results in a final concentrate which can be diluted with water to produce a reconstituted juice having a flavor substantially that of the original fresh juice but free from the bitter essential oils. Such a concentrate substantially free of essential oils is usually preferred but the essential oils are also recovered in undamaged condition in the present process and all or any desired portion thereof can also be added to the juice concentrate to substantially completely restore the original taste of the juice. The final concentrate of the present invention can also have a portion of unconcentrated fresh juice added thereto, if desired. Either with or without the addition of such fresh unconcentrated juice, the product of the present invention can be frozen and marketed in frozen condition. In the present process the flavoring materials are not subjected to sufficiently high temperatures for sufficient time to damage the desirable properties of such materials and the final concentrate may contain substantially all of the desirable flavoring materials of the original juice instead of a minor portion thereof.

It is therefore an object of the present invention to provide an improved process of concentrating fruit juices in which flavoring materials vaporized from the juice are recovered in undamaged form and are returned to the juice concentrate.

Another object of the invention is to provide a process of concentrating fruit juices in which concentration is accomplished by evaporation of water at low temperatures and flavoring materials are separated from the water vaporized during the process by adsorption upon a solid adsorbent and are recovered from such adsorbent and returned to the concentrate.

Another object of the invention is to provide a process of concentrating citrus fruit juice in which water soluble flavoring materials, usually lost in the water evaporated from the fresh juice, are recovered and returned to the concentrate.

Another object of the invention is to provide an improved fruit juice concentrate containing substantially all of the volatile flavoring materials in the original fruit juice in undamaged form.

Other objects and advantages of the invention will appear in the following more detailed description of the invention made with reference to the attached drawing, of which:

Fig. 1 is a schematic diagram of apparatus suitable for carrying out the preferred process of the present invention; and Fig. 2 is a view similar to Fig. 1 showing a portion of an apparatus suitable for carrying out a modified process in accordance with the present invention.

Referring more particularly to Fig. 1 of the drawing this figure illustrates, by way of example, a known type of multiple effect evaporating system containing evaporating chambers 10, 11 and 12 of a three-effect system to which has been added an adsorption system containing adsorption chambers 13 and 14 through which the vapors from the evaporating chamber 10 of the first effect are alternately passed, adsorption chambers 16 and 17 through which the vapors from the evaporating chamber 11 of the second effect are alternately passed and adsorption chambers 18 and 19 through which the vapors from the evaporating chamber 12 of the third effect are alternately passed.

The evaporating chambers 10, 11 and 12 may contain a plurality of vertical tubes (not shown) as is well known in the art. The fresh juice to be concentrated may be introduced into the top of the evaporating chamber 10 as indicated by the line 21 so as to flow downwardly in films on the inner walls of the above mentioned tubes into a vapor separating zone (not shown) in the lower end of the evaporating chamber as is also well known in the art. The evaporating chamber 10 may be surrounded by a heating jacket 22 through which any desired heating medium such as heated water may be flowed as indicated by the pipes 23 and 24.

Vapors separated in the vapor separating zone may be removed therefrom through a pipe 26 and passed alternately through the adsorption chambers 13 and 14. That is to say, the adsorption chambers 13 and 14 are packed with pieces of a solid adsorbent such as activated carbon with which the vapors from the evaporating chamber 10 come into contact.

As indicated above, the chambers 13 and 14 are employed alternately so that flavoring materials adsorbed on the adsorbent in one of the chambers may be stripped therefrom while the vapors from the evaporating chamber 10 are passed through the other adsorption chamber. After passage through one or the other of the adsorption chambers 13 or 14, the vapors, substantially free from volatile flavoring materials, may be introduced through the pipe 27 into the heating jacket 28 of the evaporating chamber 11 of the second effect so that such vapors constitute a heating medium in such heating jacket.

Partially concentrated juice may be pumped from the lower end of the evaporating chamber 10 by a pump 29 and delivered through a pipe 31 into the top of the evaporating chamber 11. The partially concentrated juice is further concentrated in the evaporating chamber 11 and vapors may be withdrawn from the lower end of said chamber through the pipe 32 and passed alternately through the adsorption chambers 16 and 17 which also contain a solid adsorbent. Again any volatile flavoring materials are adsorbed on the adsorbent in one or the other of the adsorption chambers 16 and 17 and the resulting vapors substantially free of flavoring materials may be introduced into the heating jacket 33 of the evaporating chamber 12 through a pipe 34. The further concentrated juice may be pumped from the lower end of the evaporating chamber 11 by means of a pump 36 and delivered through a pipe 37 to the upper end of the evaporating chamber 12 for further concentration in such evaporating chamber. Vapors may be withdrawn from the lower end of the evaporating chamber 12 through a pipe 38 and passed alternately through the adsorption chambers 18 and 19 also containing a solid adsorbent. The resulting vapors, substantially free of flavoring materials may be delivered through a pipe 39 into a condenser 41. The condenser 41 is shown as being of the indirect heat exchange type having a barometric column as indicated at 42 but may be of the jet type. A cooling medium such as cold water is also supplied to the condenser 41 and the water vapor from the adsorbing chambers 18 or 19 is condensed in the condenser 41 and may be collected in a well 43 and discharged from the process through a pipe 44. The condenser 41 may be provided with a steam jet ejector 46a so as to maintain a vacuum in the evaporating chambers 10, 11 and 12. The concentrated juice may be withdrawn from the evaporating chamber 12 of the third effect by means of a pump 46 and delivered through a pipe 47 into a tank 48.

The water vapor delivered into the heating jacket 28 of the evaporating chamber 11 through the pipe 27 is condensed in the heating jacket 28 and may be delivered through a pipe 49 to the well 43. Similarly, the water vapor delivered into the heating jacket 33 of the evaporating chamber 12 through the pipe 34 is condensed in such heating jacket and may be delivered into the pipe 49 through a pipe 51. The pipes 49 and 51 may constitute a barometric column so as to maintain the vacuum in the evaporating chambers.

Low pressure steam may be employed to strip the flavoring materials from the adsorbent in the various adsorption chambers 13, 14, 16, 17, 18 and 19. Thus, steam from the pipe 52 may be passed upwardly through any of such adsorption chambers which have been employed to adsorb flavoring material while the other adsorption chamber of any pair of adsorption chambers is being employed for adsorption purposes. For example, steam may be delivered to one or the other of adsorption chambers 13 and 14 through a pipe 53, passed through one of these adsorption chambers and delivered through a pipe 54 to a pipe 56. Similarly, steam may be delivered to one or the other of the adsorption chambers 16 and 17 through a pipe 57 and after being passed through one of such adsorption chambers delivered into the pipe 56 through a pipe 58. In the same manner, steam from the pipe 52 may be delivered through a pipe 59 into one of the adsorption chambers 18 or 19 and after passage therethrough delivered by pipe 61 into the pipe 56.

Steam from the pipe 52 may be of somewhat higher temperature than the temperature of the vapors passed through the adsorption chambers during adsorption of volatile flavoring materials therefrom. The volatile flavoring materials adsorbed on the solid adsorbent are removed by the stripping steam and a mixture of steam and vapors of the flavoring material is present in the pipe 56 and is delivered through this pipe to a condenser 62. A cooling medium such as cold water may be delivered to the condenser 62, which may be of the indirect heat exchange type, so that a flavor concentrate is condensed in the condenser 62. This flavor concentrate may be delivered through a barometric column 63 into a collecting tank 64. A steam jet ejector 66 may be connected to the condenser 62 in order to maintain a vacuum in the adsorption chambers during stripping of flavoring material from the solid adsorbent therein.

The juice concentrate may be delivered from the tank 48 into a blending tank 67 and all or any desired portion of the flavor concentrate may be delivered from the tank 64 through a pipe 68 into the blending tank 67 so that a blend of concentrated juice and concentrated flavoring material may be withdrawn through the pipe 69. As indicated above, the most desirable flavoring materials are water soluble and are present in solution in water in the tank 64. Any essential oils which may be in the fruit juice are also stripped from the adsorbent in the various adsorption chambers and condensed in the condenser 62. Such essential oils are water insoluble and separate as an upper layer in the tank 64 and may be separately withdrawn from the process through a pipe 71. If desired, any desired portion of such essential oils may be added to the final concentrate in the blending tank 67 and if desired any desired portion of fresh juice may also be added to the concentrate in the blending tank 69 as indicated by the pipe 72.

The evaporation process is preferably carried out at as low temperatures as practical. For example, the heating medium introduced into the heating jacket 22 of the evaporating chamber of the first effect may have a temperature ranging from 85 to 100° F. Water is a suitable heating medium and may be discharged from the heating jacket at temperatures ranging from 10 to 12° below the temperature of the incoming water. The vapors introduced into the heating jacket 28 of the evaporating chamber 11 of the second effect through the pipe 27 may, for example, have a temperature ranging between 70 and 80° F. and the vapors introduced into the heating jacket 33 of the evaporating chamber 12 of the third effect through the pipe 34 may, for example, have a temperature ranging between 60 and 70° F. The vacuum in the various evaporating chambers will usually increase progressively from the first effect to the last effect but the absolute pressure will usually be less than one inch of mercury in all of the evaporating chambers and less than ½ inch in the last effect. The highest temperature reached by the juice in each evaporation effect will usually be 5 to 10° F. below the temperature of the heating medium entering such effect.

The temperature of absorption in the various adsorption chambers will be substantially that of the temperature of the vapors passed therethrough. Thus, the temperature of adsorption in the adsorption chambers 13 or 14 may, for example, be between 85 and 100° F. while the temperature of adsorption in the adsorption chambers 16 and 17 may be between 70 and 80° F. and that in the adsorption chambers 18 and 19 may, for example, be between 60 and 70° F. Somewhat higher temperatures than this must, however, be employed to remove the absorbed flavoring materials from the adsorbent. Such temperatures are, however, preferably below 200° F. as temperatures much higher than this too rapidly deteriorate the flavoring materials. Temperatures much below 180° F. are not effective and the preferred temperature is in the neighborhood of 185° F. The steam introduced for stripping purposes from the pipe 52 will ordinarily have a temperature between 185 and 212° F. although this temperature may be, in some cases, as high as 225° F. as some cooling will occur in the adsorption chambers. It has been found that it requires between approximately 2½ and 4 pounds of steam to strip one pound of volatile flavoring materials from the adsorbent so that the flavor concentrate condensed in the condenser 62 will have a concentration ranging from approximately 20 to 30%, the average concentration being approximately 25%. In general, the higher the temperature of the stripping operation the less the steam required to effectively remove the flavoring material from the adsorbent and vice versa. Although steam is the preferred agent for stripping the flavoring materials from the adsorbent because of its low cost and ease of condensing to maintain a vacuum, its function in the stripping operation is that of an inert gas and any other inert gas such as nitrogen, carbon dioxide or the rare gases can be employed instead of steam. The stripping operation can be carried out sufficiently rapidly that the heat sensitive flavoring materials are not damaged by the increased temperatures.

The most effective solid adsorbent is an activated carbon, particularly a charcoal made from nut shells, such as coconut shells, and treated with acid. Various other types of activated carbon adsorbents may be employed and solid adsorbents other than activated carbon, for example, broken pieces of silica gel or agglomerates of activated adsorbent earths, etc., can be employed.

While Fig. 1 illustrates a three effect evaporating system, a greater number or lesser number of effects may be employed and in fact a single low temperature high vacuum evaporation stage with a single pair of adsorption chambers is within the contemplation of the present invention. Where it is desired for economical or other reasons to recover a portion only of the volatile water soluble flavoring materials, adsorption chambers such as the chambers 13 and 14 may be employed in one effect only of a multiple effect evaporating system. That is to say, one or more of the pairs of adsorption chambers shown in Fig. 1 may be omitted so long as one pair is retained. Usually, this will be the pair of adsoprtion chambers in the first effect since the vapors from this effect will ordinarily contain the greatest percentage of volatile flavoring material.

Although it is preferred to adsorb the flavoring materials on a solid adsorbent from the vapor phase, it is entirely possible to first condense the vapors from an evaporation stage and then adsorb the flavoring material from the resulting water upon a solid adsorbent. Such an operation is illustrated in Fig. 2 of the drawing. In this figure the same reference numerals as in Fig. 1 are employed for identical elements. The apparatus of Fig. 2 may include the evaporating chambers 10 and 11 but instead of passing the vapors from the lower portion of the evaporating chamber 10 through adsorption chambers, these vapors are delivered through a pipe 73 directly to the heating jacket 28 of the evaporating chamber 11 and condensed therein. The resulting water containing condensed volatile flavoring materials may be withdrawn through a pipe 74 and alternately passed through adsorption chambers 76 and 77 containing a solid adsorbent of the type discussed above. The water from which the volatile flavoring materials have been adsorbed may be discharged through a pipe 78 into a well which may be the same as the well 43 of Fig. 1. The heating jacket 28 of the evaporating chamber 11 and the adsorption chambers 76 or 77 may form part of a barometric column to maintain a vacuum in the evaporating system.

Steam may be introduced from the pipe 52 alternately into whichever adsorption chamber 76 or 77 is not being employed for adsorption in order to strip the adsorbed flavoring materials from the solid adsorbent. Stripping conditions and amount of steam may be the same as that described above with respect to the adsorption chambers of Fig. 1 and the resulting steam and vapors of flavoring material may be delivered through the pipe 56 to a condenser such as the condenser 62 of Fig. 1. Again the evaporating system may contain a single evaporating chamber in which case the heating jacket 28 of the evaporating chamber 11 would be replaced by a condenser such as the condenser 41 of Fig. 1 or the evaporating system may contain several effects, the last effect containing a condenser such as the condenser 41 from which the condensate would be delivered to adsorption chambers. Also again the adsorption chambers may be employed in only one of the various effects if it is not desired to recover all of the volatile flavoring materials.

While the above description of the invention is chiefly concerned with orange juice or other citrus fruit juice such as grapefruit juice, it is also applicable to substantially all fruit juices such as pineapple juice, apple juice, grape juice, etc. Although the invention has been described as producing an improved fruit juice concentrate, it is pointed out that it also produces a flavoring concentrate which can be employed or sold in whole or in part for flavoring other materials than the concentrated juice. Thus, for example, a portion only of the flavoring material concentrate may be added to the concentrated juice and the remainder employed for other purposes. Such flavoring concentrate can, for example, be employed to make a synthetic juice by adding it to water along with sugar and the appropriate fruit acid or can be employed as a flavoring material for various other purposes.

What is claimed is:

1. In a process for producing a fruit juice concentrate which includes the step of evaporating water and volatile flavoring materials from fruit juice, the improvement which comprises, adsorbing on a solid adsorbent flavoring materials vaporized with said water, recovering said flavoring materials from said adsorbent as a liquid flavor concentrate and adding at least a portion of said flavor concentrate to said juice concentrate.

2. The process as defined in claim 1 in which said flavoring materials are brought into contact with said adsorbent while in vapor form and in admixture with water vapors to cause selective adsorption of said flavoring materials.

3. The process as defined in claim 1 in which the vapors of said flavoring materials and water are condensed and the resulting water and liquid flavoring materials are brought into contact with said adsorbent to cause selective adsorption of said flavoring materials.

4. In a process for producing a fruit juice concentrate including the step of evaporating water from fruit juice under vacuum and at a sufficiently low temperature to prevent deleterious degradation of volatile flavoring materials present in said juice, said volatile flavoring materials being largely vaporized with said water, the improvement which comprises, adsorbing on a solid adsorbent the flavoring materials vaporized with said water, thereafter passing an inert gas in contact with said adsorbent to remove vapors of said flavoring materials from said adsorbent, condensing the last mentioned vapors to recover a liquid flavor concentrate and adding said flavor concentrate to said juice concentrate.

5. In a process for producing a fruit juice concentrate including the step of evaporating water from fruit juice under vacuum and at a sufficiently low temperature to prevent deleterious degradation of volatile flavoring materials present in said juice, said volatile flavoring materials being largely vaporized with said water, the improvement which comprises, adsorbing on a solid adsorbent the flavoring materials vaporized with said water, thereafter passing low pressure steam in contact with said adsorbent to remove vapors of said flavoring materials from said adsorbent condensing the last mentioned vapors and steam to recover a liquid flavor concentrate and adding said flavor concentrate to said juice concentrate.

6. In a process for producing a fruit juice concentrate including the step of evaporating a mixture of water and volatile flavoring material from fruit juice under vacuum conditions and while said juice is at a temperature below 100° F., the improvement which comprises, contacting activated carbon with said mixture to cause selective adsorption of flavoring materials upon said carbon, thereafter passing steam at a temperature between approximately 185 and 212° F. in contact with said carbon under vacuum conditions to remove vapors of flavoring material from said carbon, condensing the last mentioned vapors and said steam to produce a flavor concentrate and blending said flavor concentrate with said juice concentrate.

7. In a process for producing a fruit juice concentrate including the step of evaporating a mixture of water and volatile flavoring material from fruit juice under vacuum conditions and while said juice is at a temperature below 100° F., the improvement which comprises, contacting activated carbon with said mixture while said mixture is in vapor form to cause selective adsorption of flavoring materials upon said carbon, thereafter passing steam at a temperature between approximately 185 and 212° F. in contact with said carbon under vacuum conditions to remove vapors of flavoring material from said carbon, condensing the last mentioned vapors and said steam to produce a flavor concentrate and blending said flavor concentrate with said juice concentrate.

8. In a process for producing a fruit juice concentrate including the step of evaporating a mixture of water and volatile flavoring material from fruit juice under vacuum conditions and while said juice is at a temperature below 100° F., the improvement which comprises, condensing the mixture of vapors evaporated from said juice contacting activated carbon with the resulting liquid mixture to cause selective adsoption of flavoring materials upon said carbon, thereafter passing steam at a temperature between approximately 185 and 212° F. in contact with said carbon under vacuum conditions to remove vapors of flavoring material from said carbon, condensing the last mentioned vapors and said steam to produce a flavor concentrate and blending said flavor concentrate with said juice concentrate.

9. The process of producing a flavor concentrate from fruit juice, which process comprises evaporating water and volatile flavoring material from said juice, contacting a solid absorbent with the resulting mixture to selectively adsorb flavoring materials on said adsorbent, thereafter contacting said adsorbent with low pressure steam to remove vapors of flavoring material from said adsorbent in admixture with said steam, and condensing the last mentioned vapors and steams to produce said concentrate.

10. The process of producing a flavor concentrate from fruit juice, which process comprises evaporating water and volatile flavoring material from said juice while said juice is at a temperature below 100° F. and under vacuum conditions, contacting activated carbon with the resulting mixture while said mixture is in vapor form to selectively adsorb flavoring materials on said carbon, thereafter contacting said carbon with steam under vacuum conditions and at a temperature between 185 and 212° F. to remove vapors of flavoring material from said carbon in admixture with said steams, and condensing the last mentioned vapors and steams to produce said concentrate.

11. The process of producing a flavor concentrate from fruit juice, which process comprises evaporating water and volatile flavoring material from said juice while said juice is at a temperature below 100° F. and under vacuum conditions, contacting activated carbon with the resulting mixture after said mixture has been condensed to liquid form to selectively adsorb flavoring materials on said carbon, thereafter contacting said carbon with steam under vacuum conditions and at a temperature between 185 and 212° F. to remove vapors of flavoring material from said carbon in admixture with said steams, and condensing the last mentioned vapors and steams to produce said concentrate.

12. A process for producing a fruit juice concentrate from a fruit juice containing volatile water soluble flavoring materials and volatile substantially water insoluble essential oils, comprising: evaporating under vacuum conditions at a temperature below 100° F., a mixture of water, flavoring materials and essential oils; contacting a solid adsorbent with said mixture to selectively adsorb said flavoring materials and said essential oils; passing steam at a temperature between approximately 185 and 212° F. in contact with said adsorbent under vacuum conditions to remove vapors of said flavoring materials and said essential oils from said adsorbent; condensing said vapors and said steam to form a body of liquid having a lower aqueous layer containing dissolved flavoring materials and an upper layer comprising said essential oils; withdrawing essential oils from said upper layer; withdrawing said aqueous solution of said flavoring materials from said lower layer; and blending said aqueous solution of said flavoring materials with said juice concentrate.

References Cited in the file of this patent

UNITED STATES PATENTS

| | | |
|---|---|---|
| 1,595,683 | Burrell et al. | Aug. 10, 1926 |
| 2,450,774 | Zahn | Oct. 5, 1948 |
| 2,457,315 | Milleville | Dec. 28, 1948 |
| 2,513,813 | Milleville | July 4, 1950 |
| 2,625,505 | Cross | Jan. 13, 1953 |

OTHER REFERENCES

"Adsorption," Mantell, 1945, pp. 187, 190–193.